E. B. HESS AND L. C. MYERS.
TYPEWRITING MACHINE.
APPLICATION FILED AUG. 19, 1920.

1,427,467.

Patented Aug. 29, 1922.
7 SHEETS—SHEET 2.

Inventors
Edward B. Hess
Lewis C. Myers
By
Attorney

UNITED STATES PATENT OFFICE.

EDWARD B. HESS AND LEWIS C. MYERS, OF BROOKLYN, NEW YORK, ASSIGNORS TO ROYAL TYPEWRITER COMPANY, INC., OF NEW YORK, N. Y., A CORPORATION OF NEW YORK.

TYPEWRITING MACHINE.

1,427,467.  Specification of Letters Patent.  Patented Aug. 29, 1922.

Original application filed May 11, 1920, Serial No. 380,601. Divided and this application filed August 19, 1920. Serial No. 404,534.

*To all whom it may concern:*

Be it known that we, EDWARD B. HESS and LEWIS C. MYERS, citizens of the United States of America, and residents of the city of New York, in the borough of Brooklyn, county of Kings, and State of New York, have invented certain new and useful Improvements in Typewriting Machines, of which the following is a specification.

The present invention relates generally to typewriting machines, and has more particularly reference to a novel construction of shiftable carriage particularly, though not exclusively, adapted to be used in connection with the improvement on the Royal typewriter set forth in an application Ser. No. 380601 filed May 11, 1920, of which this application is a division. The structure more particularly involved is one in which the shiftable platen carriage is mounted on the transversely traveling carriage; and the invention consists of the hereinafter disclosed features of construction and arrangement of parts, a preferred form of which is embodied in the accompanying drawings, in which—

The framing of the machine consists of the main frame work having side walls 1 and a rear wall 2 and supplementary framing comprising a segment support 3, lower stationary raceway 4, extending transversely across the machine and supported in the side walls 1, together with escapement framing extending longitudinally of the machine and consisting of an escapement frame 5 connected with the underside of lower raceway 4, and escapement wheel support 6 connected with the escapement frame and with the rear wall 2.

Supported on the lower raceway 4 is a transversely movable carriage 7 in which is supported a shiftable carriage 8 carrying the platen 9, the said shiftable carriage being raised and lowered by means of shift rail 10 extending transversely across the machine above the escapement frame and in rear of lower raceway 4.

The lower ball race 4 constitutes what may be termed a "mono-rail" support for the transversely traveling carriage 7, additional means for supporting the overhang of said carriage being provided on the escapement framing, said additional means here taking the form of two guide rollers 41 and 42. Escapement wheel support 6 is provided with a bushing 43 for the reception of the spindle of escapement wheel 44 and escapement pinion 45 and has an aperture 46 for the reception of screw 47 that holds the guide roller 41 in position. Guide roller 42 is carried by a plate 48 secured to support 6 by means of screw 49.

The transversely traveling carriage is composed of traveling ball race 50 and end standards 51 provided with rearwardly extending overhanging portions 52 in which are mounted a transversely extending guide rod 53 (which here takes the form of a rock-shaft) that engages rollers 41 and 42. In the form here disclosed, rock shaft 53 is held at each end by a bearing screw 54 having a bearing portion 55 fitting in an opening in overhang 52 and provided with a threaded stem 56 in engagement with a threaded opening in said rock shaft. 57 indicates a margin rail and 58 is a tabular bar, both of which are connected with overhanging portions 52 and which, in addition to the primary function implied by their names, also act as stay rods for the traveling carriage. 59 indicates clamps that are attached by means of screws 60 to upper ball race 50 and provided with horizontally extending and curved guide portions 61 that engage the underside of lower ball race 4. Between the upper and lower raceways are the usual balls 62 having encircling gears 63 engaging with racks 64 and 65 of said raceways.

The shiftable carriage 8 is constructed as follows:—80 is a transversely extending and horizontally disposed channel member of sheet metal having bent ends 81 adjacent which are filling blocks 82. Said channel member is connected with end walls 83 of the shiftable carriage by means of screws 84 that pass through walls 83, ends 81 and into filling blocks 82. Channel member 80 and filling block 82 are also connected together by means of counter-sunk screws 85 and suitable bumper stops are carried by filling blocks 82, said stops engaging with the upper side of upper raceway 50. In the present instance, this bumper stop is constructed as follows: A recess 86 is formed in the filling block and in the channel member in which is seated a cup shaped holder 87 containing a piece of leather or other similar substance 88 held in place by an abutment member 89 having a shoulder, as shown, under which passes the inturned edge of cup shaped member 87. Said cup shaped member is carried by a threaded stem 90 passing through filling block 82 and locked in position by means of a nut 91. There is a bumper structure of this character in each filling block. The shaft of platen 9 extends through end walls 83 in such manner that the platen is freely rotatable in said end walls; and said platen shaft also extends through vertical slots 92 in end standards 51 of the traveling carriage. The shiftable carriage is mounted in two pairs of parallel arms carried by the traveling carriage. One pair of these arms 93 are supported on the transversely extending guide rod 53 which, as previously pointed out, is a rock shaft with which the guide rollers 41 and 42 engage, each of these arms being provided with a bushing 94 secured to said rock shaft by pins 95 and the outer ends of arms 93 being provided with sleeves 96 through which the platen shaft passes. The other pair of parallel arms 97 are pivotally supported at 98 in end standards 51 of the transversely moving carriage and are pivotally connected at their outer ends 99 with end frame 83 of the shiftable carriage. End walls 83 of the shiftable carriage have overhanging portions 100 that are connected by a transverse brace rod 101.

Figures 11, 12:
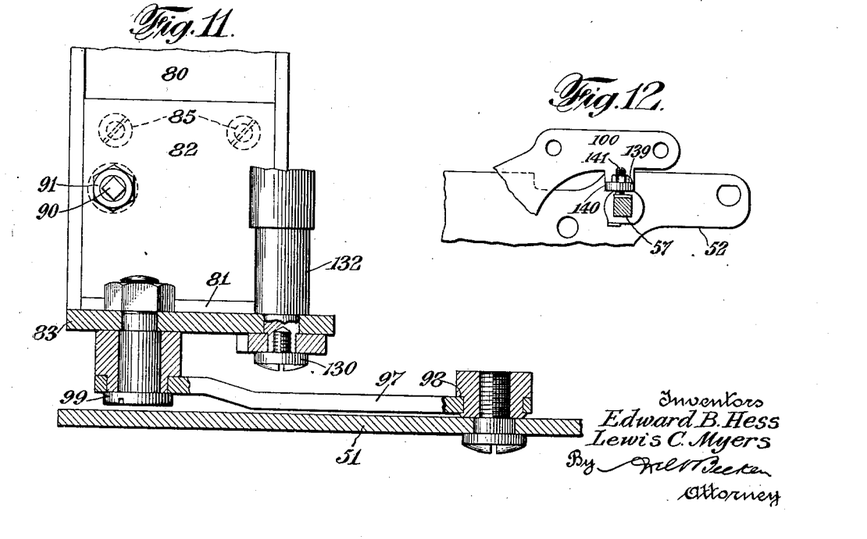
Fig. 11 is a horizontal sectional view on the line 11—11 of Fig. 10.
Fig. 12 is a detail sectional view of a modified form of the shiftable carriage stop shown in the upper right hand corner of Fig. 10.
Figure 13:
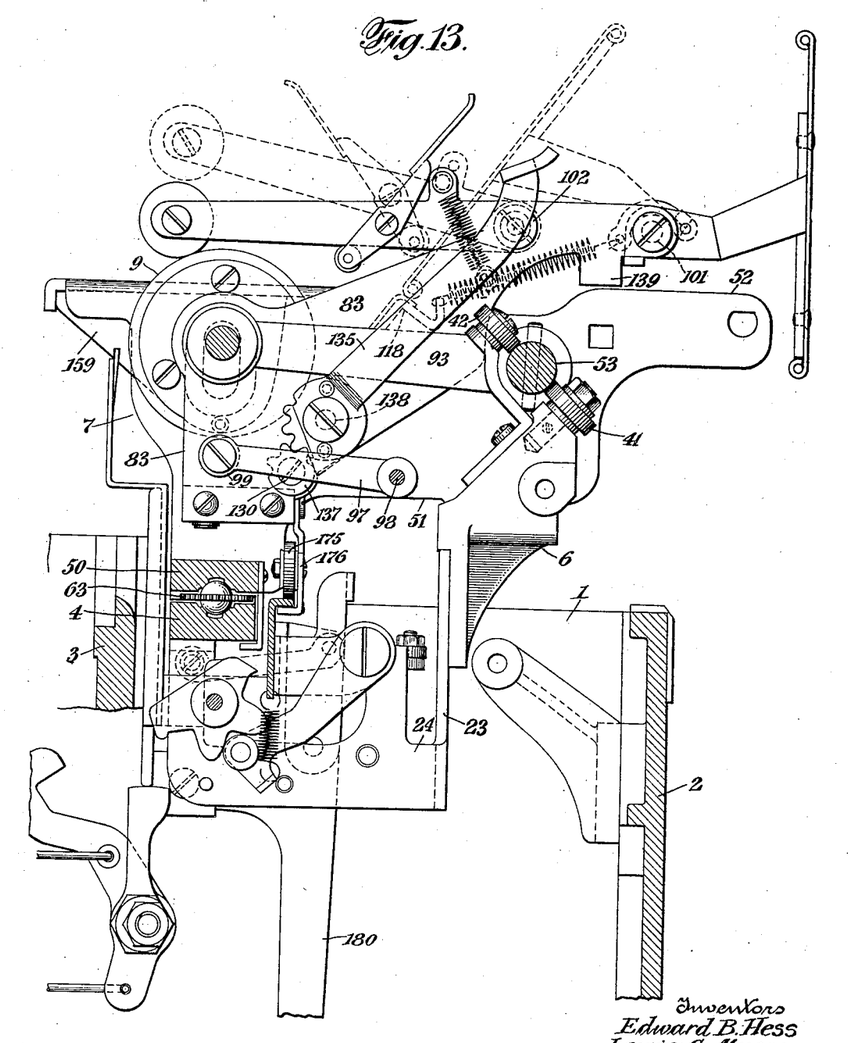
Fig. 13 is a vertical sectional view on the line 13—13 of Fig. 1.

Paper pan support 118 extends transversely between end walls 83, being attached to the latter by means of brackets 119, and is provided with struck-up portions 120 that form bearings for pendant levers 121 carrying a lower rear pressure roller 122 and normally urged into engagement with the platen by means of a flat spring 123 having one end secured to the paper pan support. 124 indicates a lower front pressure feed roll carried by a bell crank 125 pivotally supported in ears 126 struck up from transverse channel member 80 and normally urged into engagement with the platen by means of a flat spring 127 mounted on a raised stud 128 on said channel member and having its end 129 turned downwardly to engage the bottom of said channel member. A suitable releasing means for the pressure rolls are provided, having the form here of a cam bar 130 rotatably mounted in end walls 83 and provided with cam portions or notches 131 and 132, one of which engages extension 133 of bell crank 125 and the other of which engages the end of pendent lever 121. Said cam bar 130 is also supported by means of oppositely extending struck-up portions 134 formed in one of the side walls of channel member 80. It will be understood that when cam bar 130 is turned in the proper direction, lower pressure rolls 124 and 122 will move away from the platen. The means here provided for turning cam bar 130 consists of a handle 135 carrying a sector 136 meshing with a sector 137 on the end of cam bar 130. Lever 135 is pivotally supported at 138 in one of the end walls 83. Overhanging portions 100 of end walls 83 are provided with stops that supplement bumper stops 89, having here the form of a downwardly projecting abutment member 139 that engages margin rail 57 of the traveling carriage. A modified form is shown in Fig. 12 in which member 139 is provided with an ear 140 for the reception of an adjustable screw 141 that engages margin rail 57 as a stop member.

Figure 1:
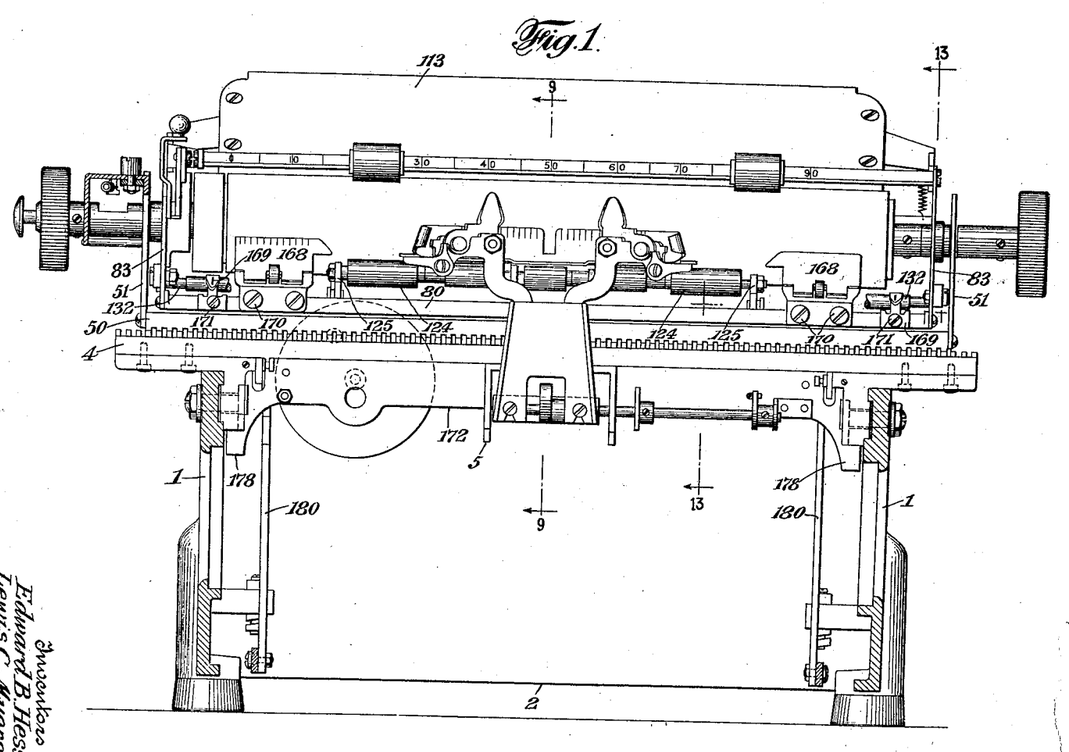
Fig. 1 is a vertical transverse sectional view of a typewriting machine embodying the invention, the section being on a line just forward of the platen so as to exclude the keyboard and type bars.
Figure 2:
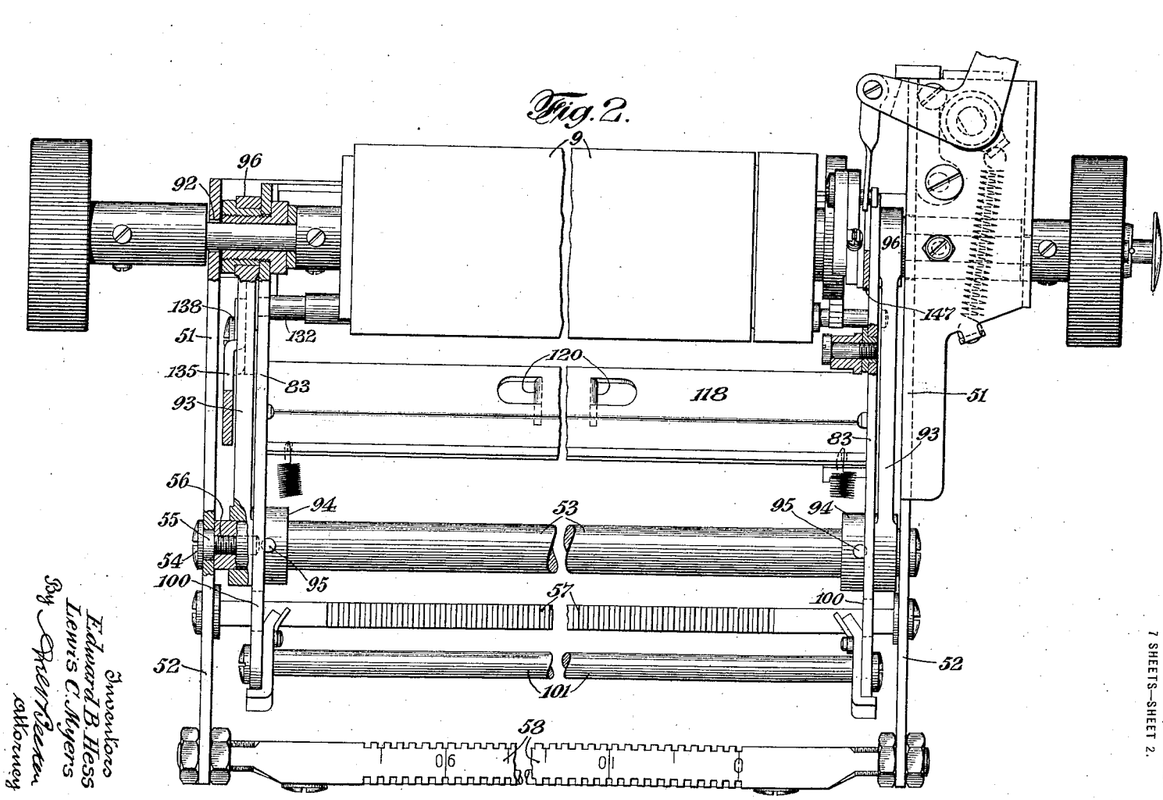
Fig. 2 is a horizontal sectional plan view showing the platen and adjacent elements.
Figure 3:
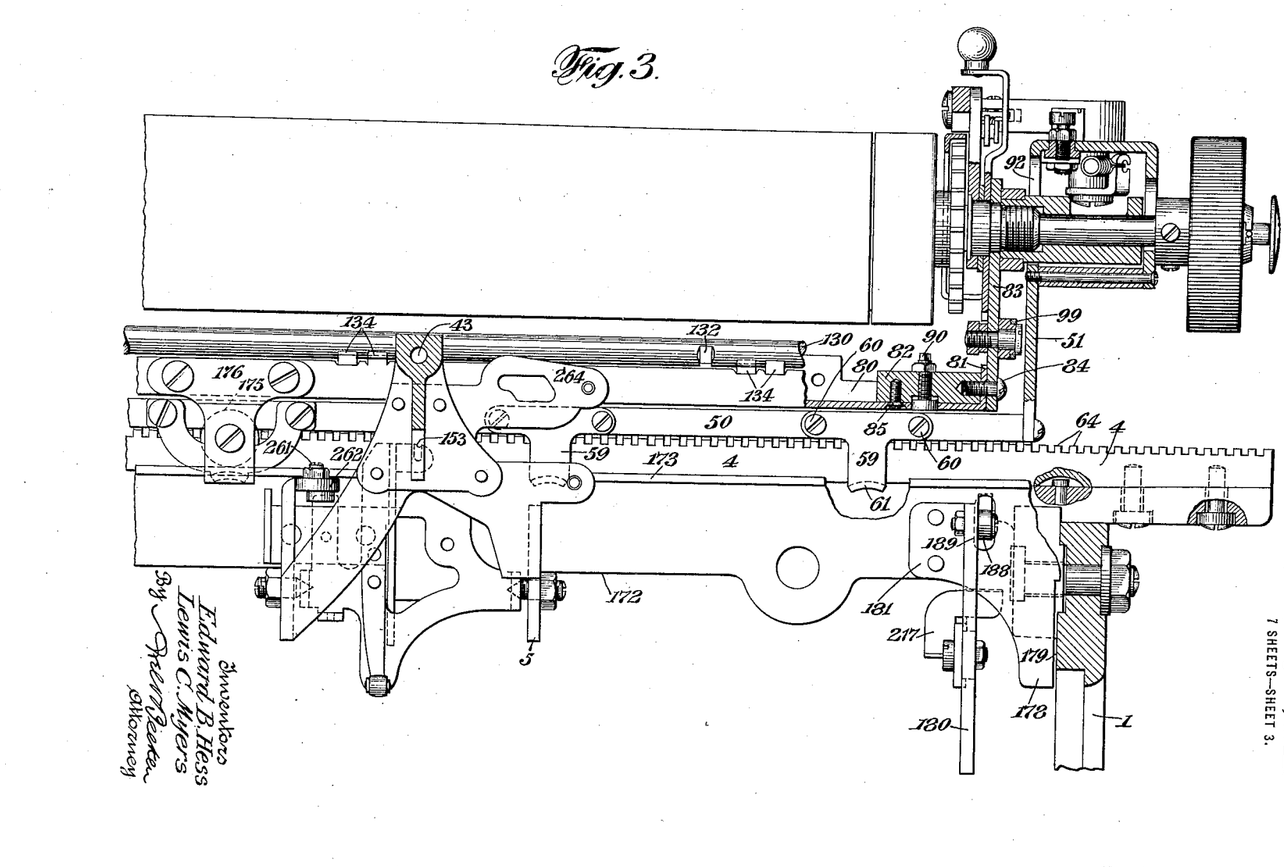
Fig. 3 is a vertical sectional view adjacent the left hand end of the platen looking from the rear of the machine.
Figures 4, 5, 6, 7, 8:
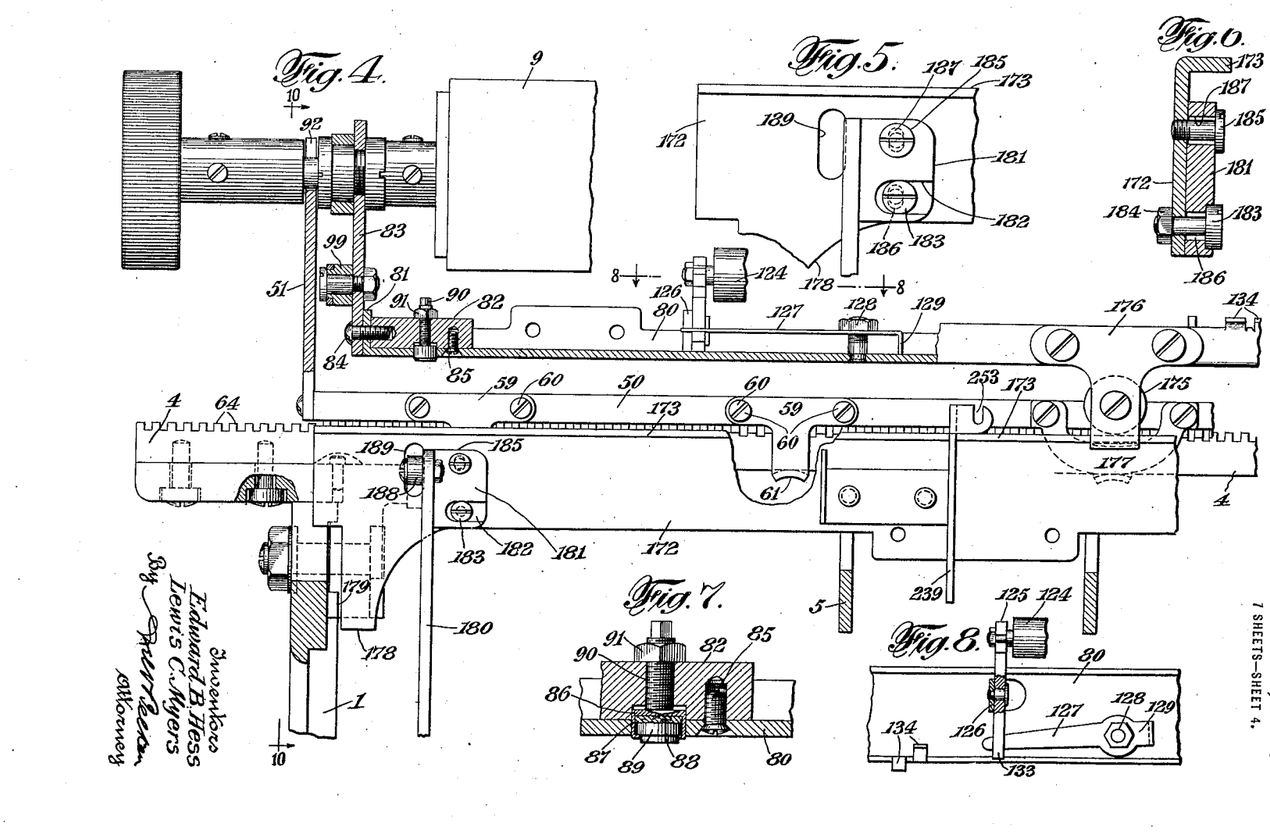
Fig. 4 is a vertical sectional view similar to Fig. 3 but showing the right hand end of the platen.
Fig. 5 is a detail view of part of Fig. 4 showing the connection between the lifting rail and the lifting arm.
Fig. 6 is a sectional view on the line 6—6 of Fig. 5.
Fig. 7 is an enlarged sectional detail view of part of the shiftable carriage shown in Fig. 4.
Fig. 8 is an enlarged view in plan with parts broken away and in section substantially on the line 8—8 of Fig. 4.
Figure 9:
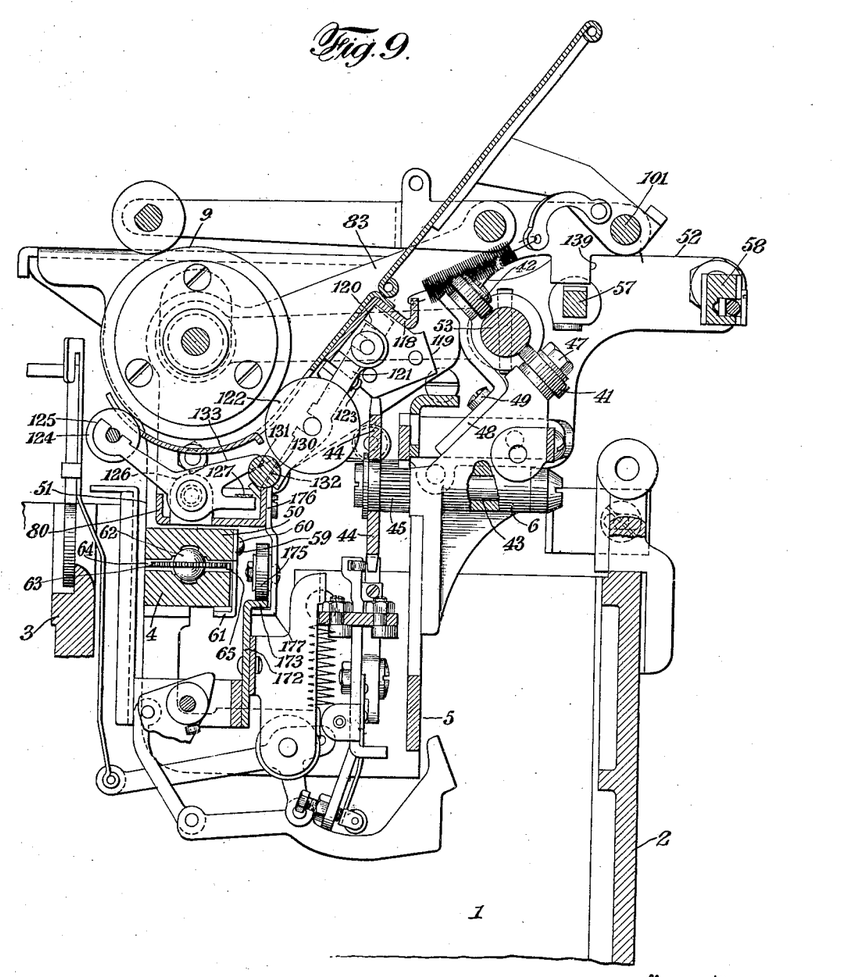
Fig. 9 is a vertical sectional view on the line 9—9 of Fig. 1.
Figure 10:
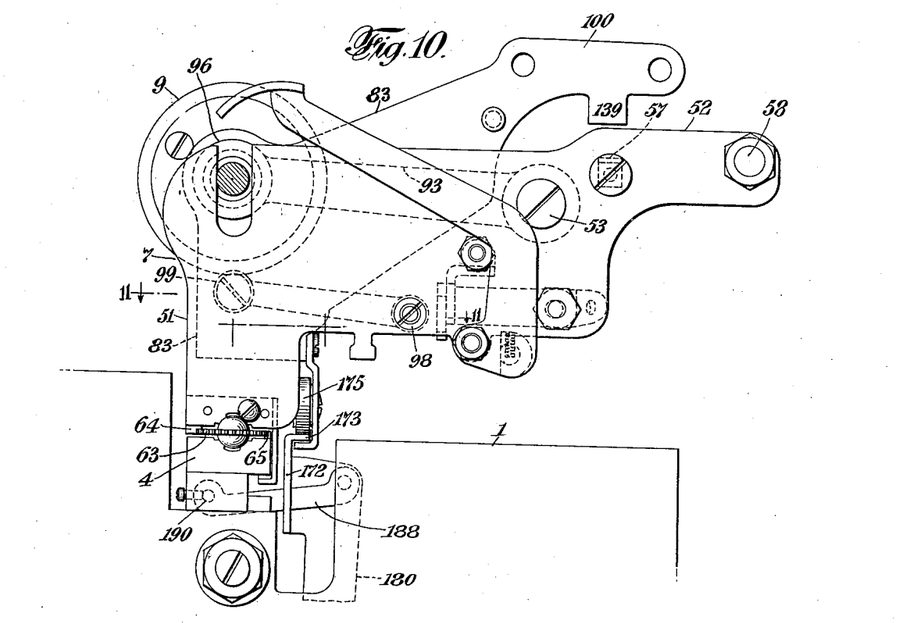
Fig. 10 is a vertical sectional view on the line 10—10 of Fig. 4.

In addition to the elements above described, the shiftable carriage also supports suitable scale indication and pointer means as shown in Fig. 1 where scale means 168 and pointer means 169 are secured to channel member 80 by suitable screws 170 and 171.

Suitable means are provided for lifting and lowering the shiftable carriage which, in this instance, comprises essentially a shift rail 172 extending transversely of the machine above the escapement frame and consisting of an angular piece of sheet metal, one face of which constitutes a horizontal track 173 on which travels the shiftable carriage traveling roller 175 carried by a suitable carriage clamp 176 having a horizontally extending guide member 177 engaging with the under side of horizontal track 173. Clamp 176 is secured in any suitable manner to channel member 80.

At each of its ends said shift rail has a downwardly extending projection 178 closely adjacent the abutment surfaces 179 of the side wall of the main frame to take up the end thrust of the carriage. Said shift rail is carried by two vertical shift arms 180 one at each end of the machine to which it is attached by means of angular extensions 181. In the present instance, provision is made for vertically adjusting said shift rail with respect to one or both of the vertical shift arms 180. As shown, angular extensions 181 are provided with a horizontal slot 182 in which is seated an eccentric adjustment member 183, the stem of which passes through shift rail 172 and is locked in position by means of lock-nut 184. Eccentric member 183 thus constitutes a binding screw that clamps shift rail 172 and extension 181 together. 185 is a second binding screw that passes through extension 181 and is tapped into shift rail 172. At the point where binding screws 183 and 185 pass through extension 181, there are vertically elongated openings 186 and 187. If binding screws 183 and 185 are loosened, it will be understood that, by shifting the eccentric 183, rail 172 may be adjusted vertically so as to render said shift rail parallel with the lower raceway, after which the binding screws are tightened to retain the parts in the position to which they have been adjusted. Said shift rail and shift arms are carried by two pairs of parallel links, an upper pair 188, pivotally connected with vertical shift arms 180 at one end and extending through openings 189 in the shift rail and pivotally supported on pin 190 carried in block 32 of lower raceway 4; and another and lower pair, 191 suitably supported in the machine.

Any suitable means may be employed to lift and lower the vertical shift arms 180. Preferably, this is accomplished by the mechanism claimed in application Ser. No. 394,672 filed July 8, 1920.

The construction of the line space advancing mechanism herein disclosed is claimed in application Ser. No. 399,376 filed July 27, 1920.

The construction of the overhead bail actuating means and the paper pan actuating means herein disclosed is claimed in application Ser. No. 569,321, filed June 19, 1922.

The feature of providing raceways 4 and 50 with central gutters herein disclosed is claimed in application Ser. No. 569,322 filed June 19, 1922.

We claim—

1. In a typewriting machine, a shiftable carriage comprising: a transversely extending channel member of sheet material, means for reinforcing said channel member, and a bumper stop seated in said reinforcing means.

2. In a typewriting machine, a shiftable carriage comprising: a transversely extending channel member of sheet material having angularly turned sides and ends, a filling block at each end in said channel member, and end walls for the carriage secured to the angularly turned ends and filling blocks.

3. In a typewriting machine, a shiftable carriage comprising: a transversely extending channel member of sheet material having angularly turned sides and ends, a filling block at each end in said channel member, means for securing the filling blocks to the channel member, and end walls for the carriage secured to the channel member.

4. In a typewriting machine, a shiftable carriage comprising: a transversely extending channel member of sheet material having upturned sides and ends, a filling block at each end and in said channel member, means for securing the filling block to the channel member, end walls for the carriage secured to the channel member, and a bumper stop at each end of the channel member, consisting of a cup-shaped holder having an inturned edge, seated in a recess in the channel member and filling block, a shouldered abutment member held in place by the inturned edge of the cup-shaped holder, a cushioning member above the abutment member and within said holder, and means for adjusting the position of the cup-shaped holder.

5. In a typewriting machine, a shiftable carriage comprising: a transversely extending channel member of sheet material having upturned sides and ends, a filling block at each end in said channel member, means for securing the filling block to the channel member, end walls for the carriage secured to the channel member, a bumper stop at each end of the channel member consisting of a cup-shaped holder having an inturned edge seated in a recess in the channel member and filling block, a shouldered abutment member held in place by the inturned edge of the cup-shaped holder, a cushioning member above the abutment member and within said holder, means for adjusting the position of the cup-shaped holder including a stem carried by the holder and extending in threaded engagement with the filling block up through the top thereof, and a lock nut on the threaded stem above the filling block.

6. In a typewriting machine, a shiftable carriage comprising: a transversely extending channel member of sheet material having upturned sides and ends, a filling block at each end in said channel member, a bumper stop carried by each filling block and projecting through the channel member, countersunk screws connecting the bottom of the channel member with the filling blocks, and endwalls for the carriage connected to the channel member.

7. In a typewriting machine, a shiftable carriage comprising: a transversely extending channel member of sheet material having upturned sides and ends, a filling block at each end in said channel member, a bumper stop carried by each filling block and projecting through the channel member, countersunk screws connecting the bottom of the channel member with the filling blocks, endwalls for the carriage secured to the upturned ends of the channel member and to the filling blocks.

8. In a typewriting machine: a platen, a shiftable carriage, supporting said platen, including a transversely extending channel member of sheet material, having oppositely extending struck up portions in one of its sidewalls, endwalls for the carriage connected to said channel member, lower front and rear pressure feed rolls on said carriage, releasing means for said rolls including a cam bar mounted in the endwalls and in the oppositely extending struck up portions of the sidewalls of the channel member, a sheet metal paper pan support, on the shiftable carriage, having struck up portions forming ears, and a pendant lever mounted in said ears, and supporting the rear pressure feed rolls.

9. In a typewriting machine: a platen, a shiftable carriage, supporting said platen, including a transversely extending channel member of sheet material having oppositely extending struck up portions in one of its sidewalls, endwalls for the carriage connected to said channel member, lower front and rear pressure feed rolls on said carriage, and releasing means for said rolls including a cam bar mounted in the endwalls and in the oppositely extending struck up portions of the sidewalls of the channel member, vertically extending ears struck up from the bottom of the channel member, a bell crank one arm of which carries the front pressure roll, and a horizontally disposed leaf spring housed within the channel member engaging the other arm of the bell crank.

10. In a typewriting machine: a platen, a shiftable carriage, supporting said platen, including a transversely extending channel member of sheet material, having oppositely extending struck up portions in one of its sidewalls, endwalls for the carriage connected to said channel member, lower front and rear pressure feed rolls on said carriage, and releasing means for said rolls including a cam bar mounted in the endwalls and in the oppositely extending struck up portions of the sidewalls of the channel member, vertically extending ears struck up from the bottom of the channel member, a bell crank one arm of which carries the front pressure roll, a horizontally disposed leaf spring housed within the channel member engaging the other arm of the bell crank, a sheet metal paper pan support, on the shiftable carriage, having struck up portions forming ears, and a pendant lever mounted in said ears and supporting the rear pressure feed rolls.

11. In a typewriting machine: a platen, a shiftable carriage, supporting said platen, including a transversely extending channel member of sheet material, endwalls for the carriage connected to said channel member, vertically extending ears consisting of portions struck up from the bottom of the channel member, a bell crank mounted in said ears, a front pressure feed roll carried in one of the arms of the bell crank, a flat spring having a downturned portion engaging with the bottom of the channel member and bearing against the other arm of the bell crank, a raised stud within said channel member supporting said flat spring.

12. In a typewriting machine: a transversely traveling carriage including a transversely extending upper ballrace and end standards, a margin rail extending between the end standards, a shiftable carriage, mounted on the traveling carriage, including a transversely extending member above the ball race and end walls, bumper stops on the transversely extending member to engage the top of the ball race, and stops on the end walls of the shiftable carriage to engage the margin rail.

13. In a typewriting machine: a relatively stationary carriage raceway, a shiftable track of sheet material angular in cross section and having a horizontal track portion, a transversely movable carriage traveling on said raceway, a shiftable carriage mounted to travel with the transversely movable carriage and traveling on the shiftable track, a dependent clamp carried by the shiftable carriage, a roller on said clamp engaging the top surface of the horizontal track portion, and a guide on the clamp extending in under the lower surface of the horizontal track portion.

Signed at New York city, in the borough of Manhattan, county and State of New York, this 17th day of August 1920.

EDWARD B. HESS.
LEWIS C. MYERS.